United States Patent [19]

Seamans et al.

[11] Patent Number: 5,204,776

[45] Date of Patent: Apr. 20, 1993

[54] AUTOMATIC VIEWER AND ASSOCIATED PHOTOPRINT CARRIER FOR HALF-FRAME STEREO PRINTS

[75] Inventors: Tom M. Seamans, Corfu; Donald M. Harvey, Webster, both of N.Y.

[73] Assignee: Eastman Kodak Company, Rochester, N.Y.

[21] Appl. No.: 747,593

[22] Filed: Aug. 20, 1991

[51] Int. Cl.$^5$ .............................................. G02B 27/22
[52] U.S. Cl. ................................. 359/466; 359/467; 359/474
[58] Field of Search ..................... 359/466, 467, 474

[56] References Cited

U.S. PATENT DOCUMENTS

| | | | |
|---|---|---|---|
| 2,145,423 | 1/1939 | Long | 359/467 |
| 2,334,483 | 11/1943 | Dennis | 359/467 |
| 2,616,333 | 11/1952 | Tinker | 359/467 |
| 2,683,391 | 7/1954 | Nichols | 359/467 |

*Primary Examiner*—Scott J. Sugarman
*Attorney, Agent, or Firm*—Millen, White, Zelano and Branigan

[57] ABSTRACT

An automatic viewer for half-frame stereoprints includes a base with a pair of lenses for stereoscopic viewing mounted thereon. The base has a kicking foot and picking detent projecting therethrough for engaging openings in a carrier deck upon which the half-frame stereoprints are pivotally mounted. A control mechanism utilizes cams to coordinate movement of the kicking foot and picking detent to index the carrier deck across the base so that the photoprints may be viewed individually. The carrier deck has two rows of openings for receiving the kicker foot, allowing the viewer to advance the carrier deck from either end presenting a first set of photoprints for viewing when advancing from one end and a second set of photoprints for viewing when advanced from the opposite end. The carrier deck may be stored with other carrier decks in a binder.

8 Claims, 10 Drawing Sheets

AUTOMATIC VIEWER AND ASSOCIATED PHOTOPRINT CARRIER FOR HALF-FRAME STEREO PRINTS

The instant invention relates to an automatic viewer and print carrier associated therewith for half-frame stereo prints. More particularly, the instant invention relates to an automatic viewer for half-frame stereo prints which is motorized and views prints mounted on a card or backing which can be conveniently stored as a page in a print binder or album.

BACKGROUND ART

As is exemplified by U.S. Pat. No. 76,472 to Kohl, issued in 1868, it has long been known that three-dimensional images occur if identical images are placed adjacent one another and viewed through a pair of lenses optically shielded from one another so that the viewer's eyes function independently of one another. The stereoscope disclosed in the Kohl patent includes a plurality of pictures stacked therein for viewing. Patents such as U.S. Pat. No. 669,604 to Twifford and U.S. Pat. No. 670,752 to Wyatt, both issued in 1901, also disclose a plurality of pictures for stereoscopic viewing; however, instead of being stacked, the pictures are mounted on a rotatable drum. The rotatable drum concept is further seen in patents such as U.S. Pat. No. 739,402 to Eastman, issued in 1903, and U.S. Pat. No. 764,136 to Leeland, issued in 1904. Development of stereoscopic viewers with multiple pictures or images has continued and, as late as 1979, patents have issued on such devices as is exemplified by U.S. Pat. Nos. 4,146,303 to Baba and 4,158,480 to Mitchell.

None of these prior art approaches allow one to conveniently view photoprints which are stored in albums or binders in way that the photoprints are readily viewable either with or without a stereoscope.

SUMMARY OF THE INVENTION

It is an object of the instant invention to provide a new and improved automatic stereoscopic viewer and photoprint carrier for use therewith wherein the prints are readily storable in a binder and are conveniently viewable by a motorized viewer.

In view of the aforementioned object and other objects, the instant invention contemplates an automatic stereoscopic viewer for viewing stereoscopic photoprints wherein the stereoscopic viewer comprises a stereoscopic lens arrangement mounted on a base, over which base a plurality of stereoscopic prints are linearly advanced. The stereoscopic photoprints are pivotally mounted on a carrier deck, which deck includes first and second recesses. A kicking foot is mounted on the base of the viewer to support the carrier deck and a picking detent is mounted on the viewer base for indexing the carrier deck to position successive photoprints for viewing. A control means retracts and projects the kicking foot in concert with advancing the picking means in order to index the carrier deck over the base.

An automatic stereoscopic viewing system in accordance with the instant invention comprises a plurality of carrier decks which are storable in an album. Each carrier deck has a plurality of stereoscopic photoprints pivotally mounted thereon in overlapping relationship and each carrier deck includes first and second recesses therethrough arranged in rows. The individual carrier decks are viewed with a stereoscopic lens arrangement mounted on a base adapted to receive the carrier decks individually. A kicker foot on the base supports carrier decks thereon by engaging the first recesses and flips the photoprints over so that successive photoprints are viewable as the carrier decks are advanced. Advancement of each carrier decks is accomplished by a picking detent which individually engages the second recesses in the carrier deck. Movement of the kicking foot and picking detent is controlled for retracting and projecting the kicking foot in concert with advancing the picking detent so that the carrier decks index over the base.

The instant invention further contemplates a novel carrier deck which is useful with a photoprint viewer wherein the carrier deck includes a base plate having at least one first row of recesses for receiving a kicking foot of the viewer and a second row of recesses for receiving a picking detent of the viewer. A plurality of transparent envelopes are pivoted on the deck proximate the individual first and second recesses wherein each transparent envelope has opposed transparent surfaces through which separate photoprints are viewable. By providing an additional row of recesses for receiving the kicking foot on the opposite side of the second row of recesses, the carrier deck is advanceable through the viewer in opposite directions to view separate sets of prints.

DESCRIPTION OF THE PREFERRED EMBODIMENTS

Figure 1:
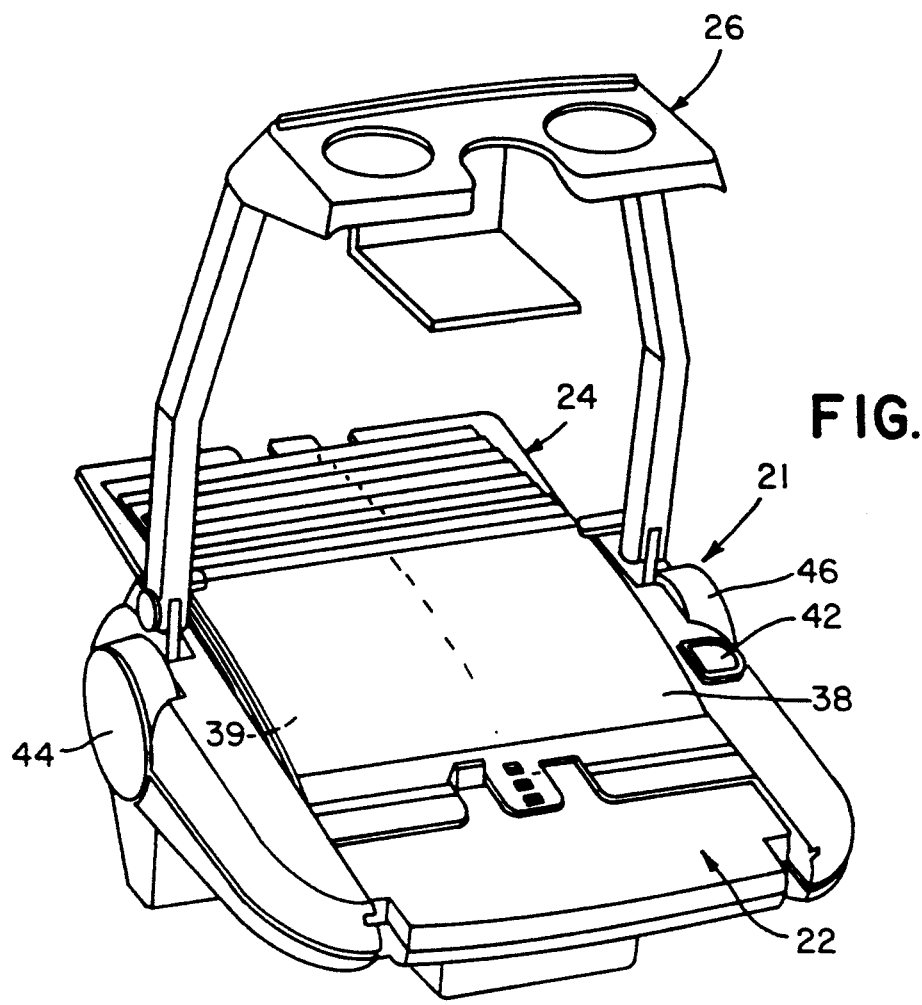
FIG. 1 is a perspective view of a stereoscopic viewer configured in accordance with the principles of the instant invention with a deck of photoprints inserted therein for viewing.
Figure 2:
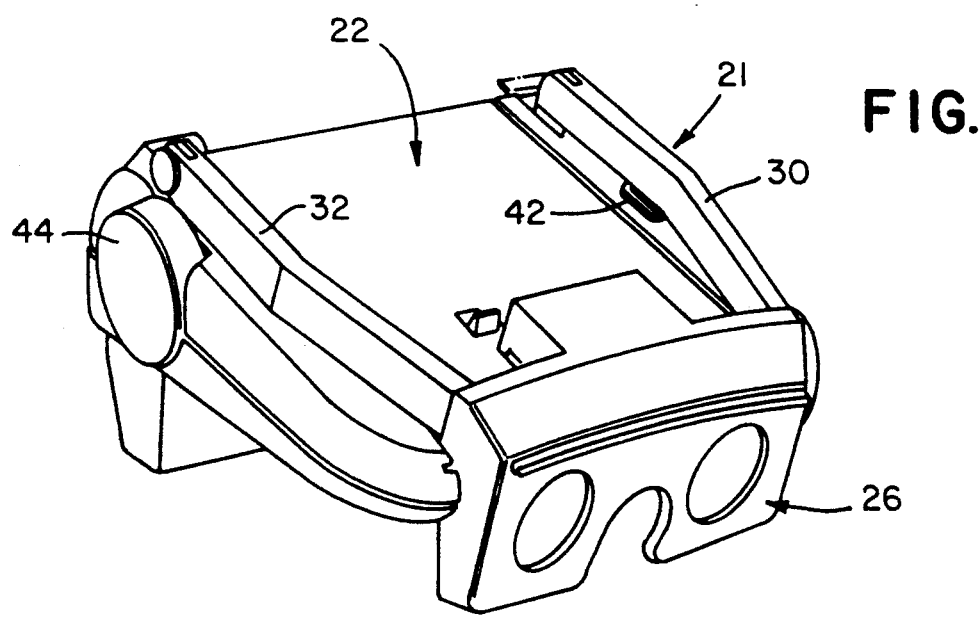
FIG. 2 is a perspective view of the stereoscopic viewer of FIG. 1 shown folded for storage.
Figure 3:
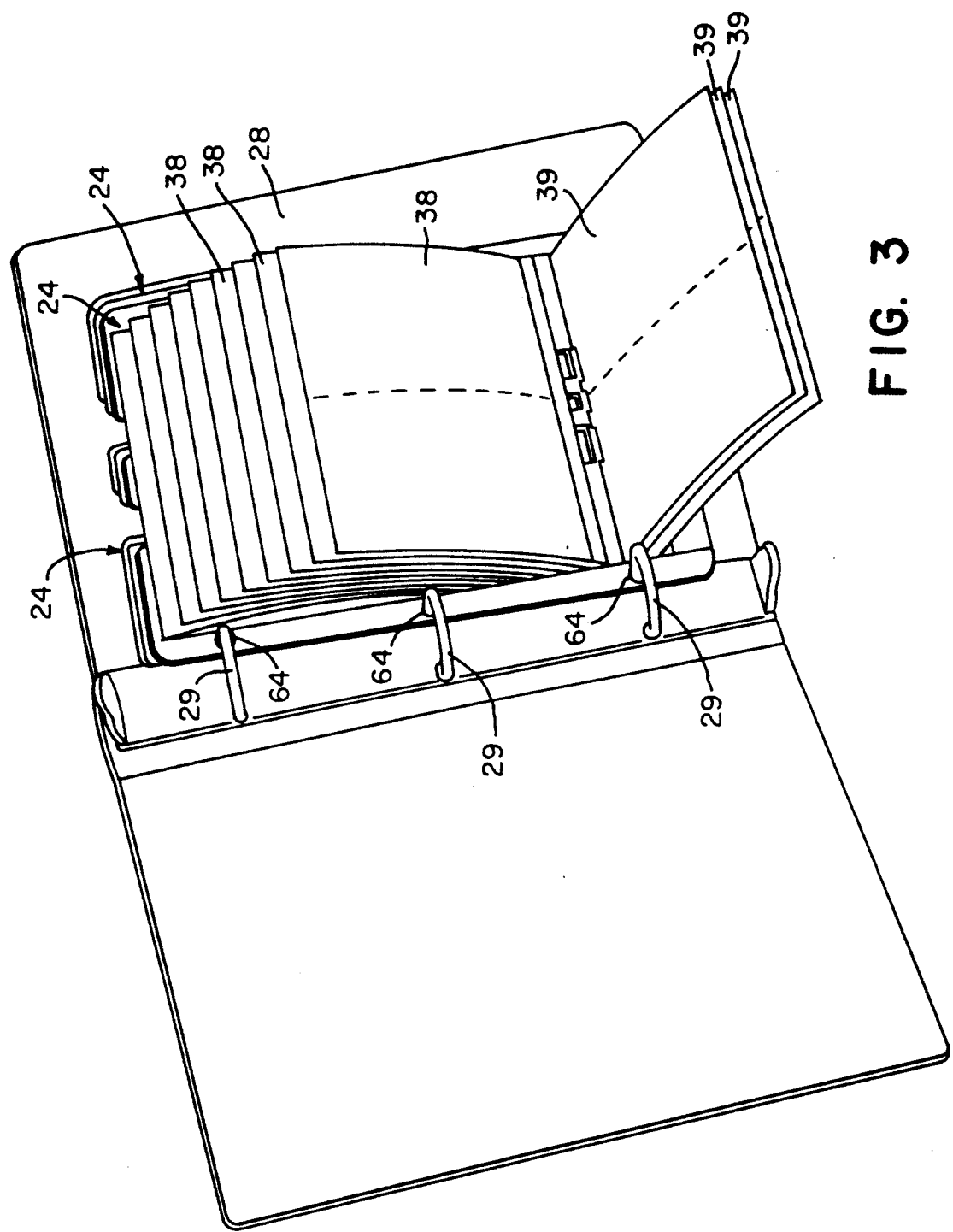
FIG. 3 is a perspective view of a photoprint album in the form of a loose-leaf notebook shown storing a plurality of photoprint decks configured in accordance with the principles of the instant invention.

Referring now primarily to FIGS. 1, 2 and 3, there is shown a stereoscopic viewer, designated generally by the numeral 21, which includes a base, designated generally by the numeral 22, for supporting a deck of photoprints, designated generally by the numeral 24, for viewing by a stereoscopic lens pair, designated generally by the numeral 26. The stereoscopic viewer 21 of FIGS. 1 and 2 includes what might be considered design features of a commercial embodiment and, therefore, has an appearance slightly different from that of other figures. As is seen in FIG. 3, a plurality of decks 24 may be stored in a binder such as a loose-leaf binder 28 having rings 29, which binder functions as a photographic album. As is seen in FIG. 2, the lens pair 26 is pivoted by arms 30 and 32 to the base 22 by pivots 34 and 36, respectively, so as to pivot to a storage position. The deck 24 includes a plurality of oppositely facing photoprints 38 and 39 (FIG. 3) which each have two identical images in accordance with standard stereoscopic practice. In accordance with the principles of the instant invention, the photoprints 38 and 39 are flipped over to expose the next print in the series while being indexed over the base 22.

The base 22 includes a button 42 for indexing the deck 24 automatically. Knobs 44 and 46 are provided for focusing the lens pair 26. Knobs 44 and 46 are for focusing, not picture advancement.

Figure 4:
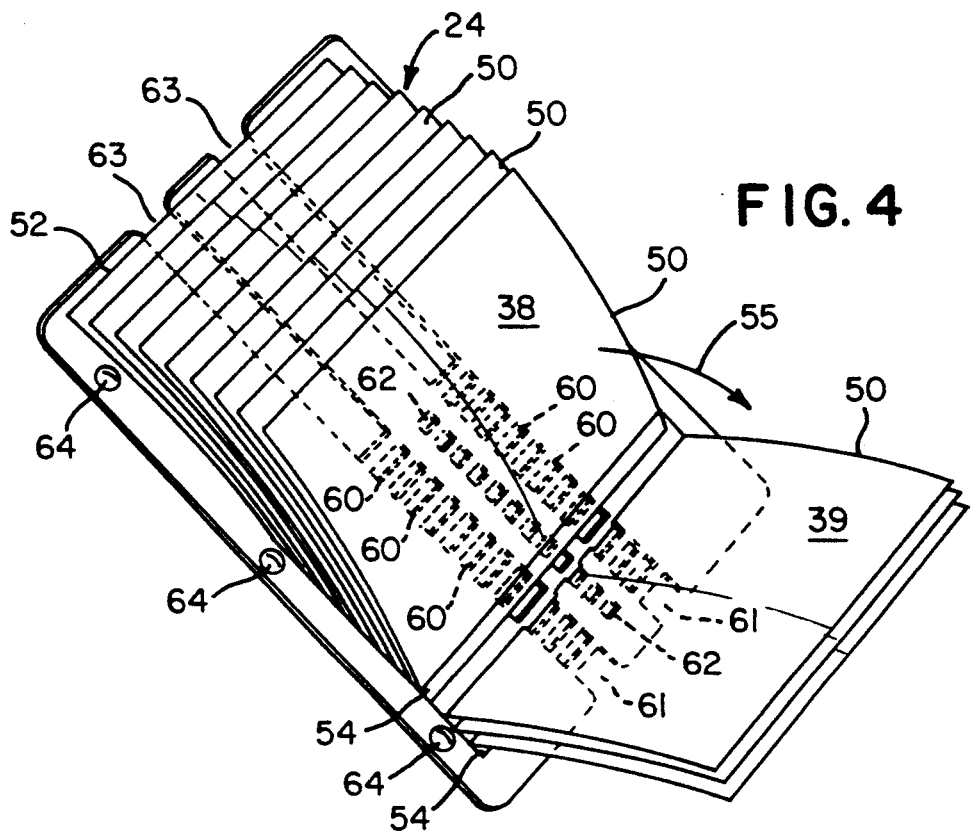
FIG. 4 is a perspective view of a photoprint deck in accordance with the instant invention with the photoprints being viewed from one side.
Figure 5:
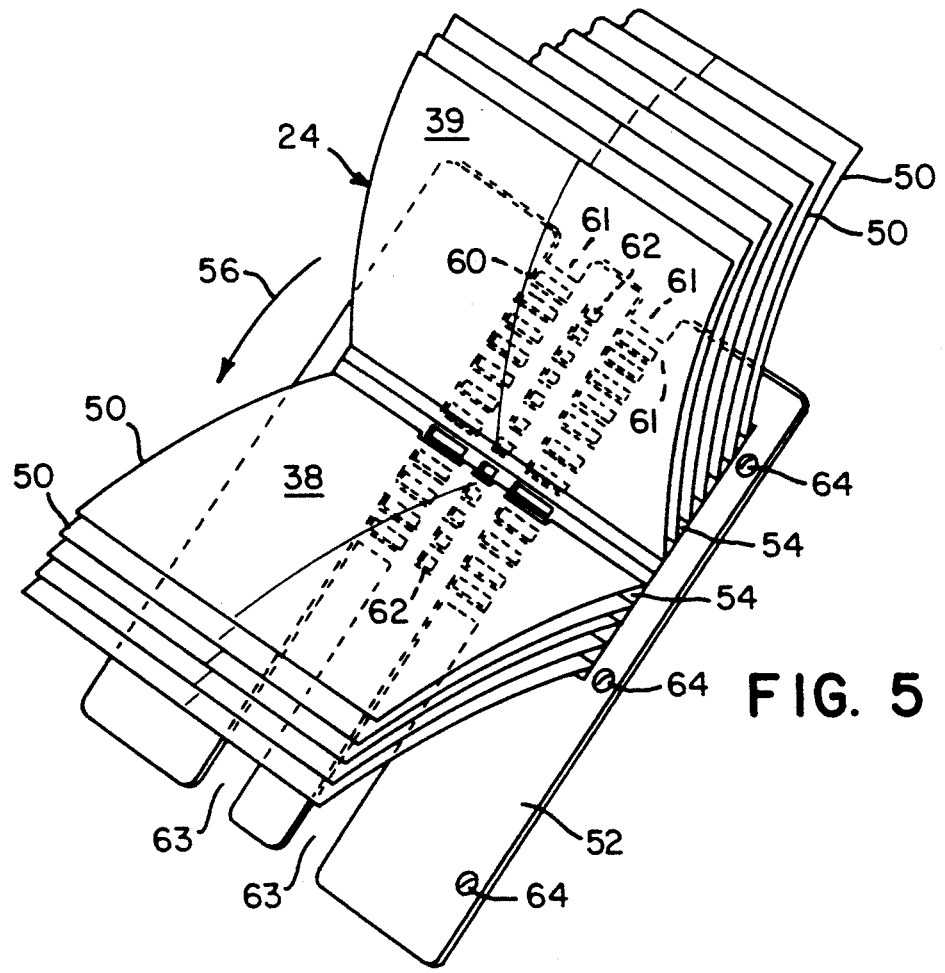
FIG. 5 is a perspective view of the photoprint deck of FIG. 4 with the photoprints being viewable from the opposite side.

Referring now to FIGS. 4 and 5, it is seen that deck 24 of photographic prints includes a plurality of transparent glassine envelopes 50, each of which includes a pair of photoprints 38 and 39 facing in opposite directions. The glassine envelopes 50 are hinged to a base card 52 by adhesive-backed, flexible hinges 54. The FIG. 5 view is inverted with respect to the FIG. 4 view and shows the deck 24 moving in the opposite direction to position photoprints 39 for viewing rather than photoprints 38. Photoprints 38 of the pair of prints 38 and 39 in each envelope 50 are viewable by the stereoscopic viewer 21 when the glassine envelopes are each flipped in the direction of arrow 55 as is shown in FIG. 4. Photoprints 39 are viewable when the glassine envelopes 50 are flipped in the direction of arrow 56 as is seen in FIG. 5.

The base card 52 of the deck 24 has first and second indexing openings 60 and 62 therein which, as will be explained hereinafter, are arranged in parallel rows and used to advance the deck across the base 22 of the automatic viewer 21. At the top and bottom ends of the card 52, there are shallow and deep slots 61 and 63, respectively, which allow the deck 24 to be indexed to view either photoprints 38 or photoprints 39. The base card 52 also has ring holes 64 adjacent one edge thereof for mounting the deck 24, along with other decks, in the ring binder 28 of FIG. 3. Alternatively, or in addition, the base card 52 of the deck 24 may have a pair of the ring holes positioned adjacent the top edge thereof for mounting the deck in a ring binder 28 having rings positions at 90° with respect to the rings 29 of FIG. 3.

Figure 6:
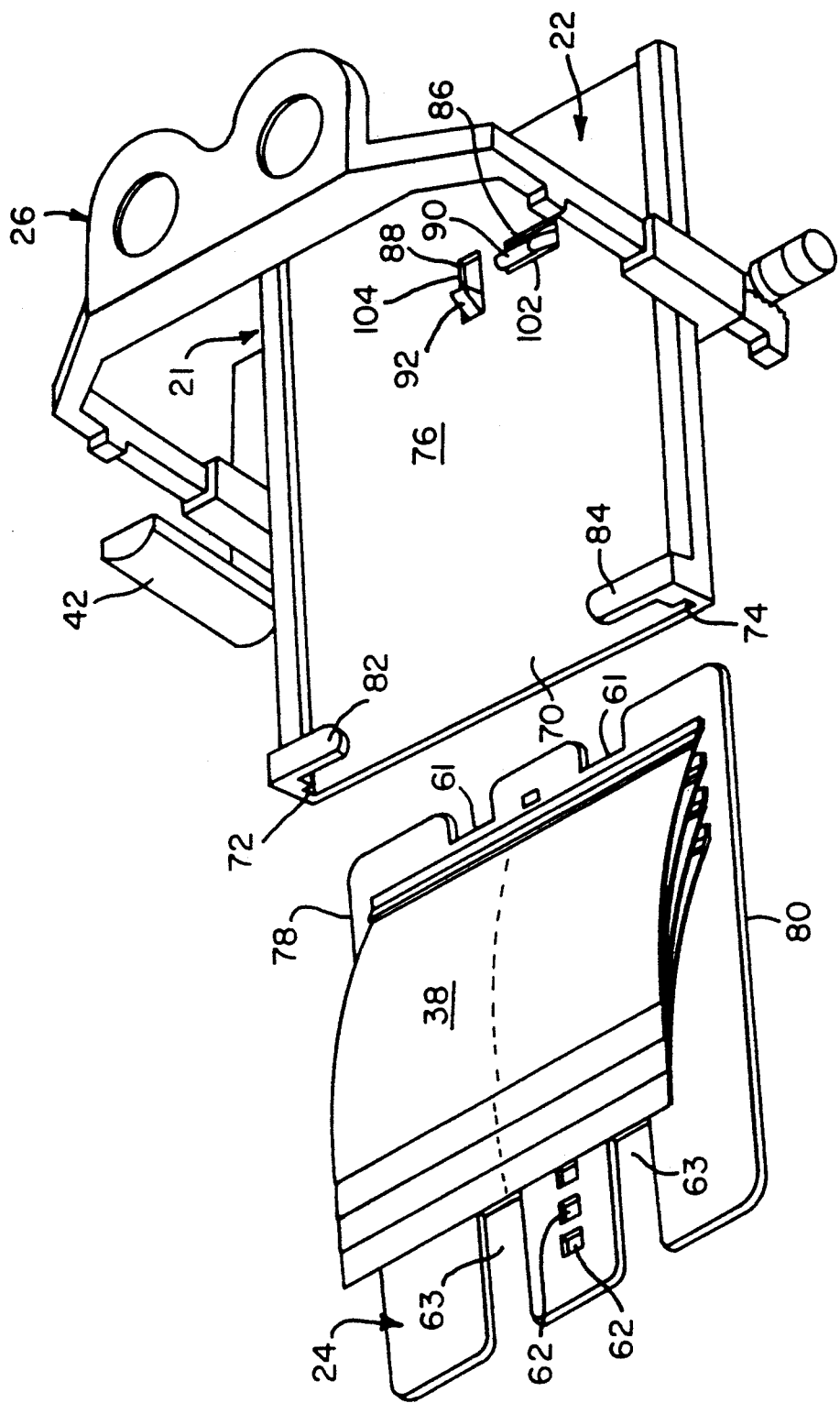
FIG. 6 is a perspective view of a portion of the stereoscopic viewer of FIGS. 1 and 3, showing a deck of photoprints being inserted for viewing.

Referring now to FIG. 6, there is shown a deck 24 aligned with the base 22 of the automatic viewer 20 prior to being slid through a retaining gate 70. A number of the envelopes 50 have been deleted so that underlying structure may be shown. The retaining gate 70 is comprised of a pair of opposed slots 72 and 74 adjacent a planar portion 76 of the base 22, which slots retain the edges 78 and 80 of deck 24. The retaining gate 70 also includes a pair of spaced retaining tabs 82 and 84 which hold the glassine envelopes 50 containing the unviewed prints 38 and 39 down as they are being viewed and prior to viewing.

The planar portion 76 of the base 22 has two openings 86 and 88 therein. Projecting through the opening 86 is a kicking foot, designated generally by the numeral 90, which sequentially registers with the openings 60 in the deck 24 to retain the deck in position on the base 22 of the viewer 21. A picking detent, designated generally by the numeral 92, extends through opening 88 and sequentially engages openings 62 in the deck 24 to index the deck down one step while the kicking foot 90 is temporarily retracted in order to view the next print 38 or 39 in the series of prints. As the kicking foot 90 re-emerges through the opening 86 to retain the deck 24, the bottom surface of the foot helps kick the envelope 50 containing the already-viewed photoprint 38 or 39 over to expose the next print in the next envelope of the series. As is seen in FIG. 6, the deck 24 has two rows of openings 60 for receiving kicking foot 90 on opposite sides of the row of openings 62 so that the deck may be inverted and advanced in the opposite direction to view photoprints 39 rather than photoprints 38.

Figure 7:
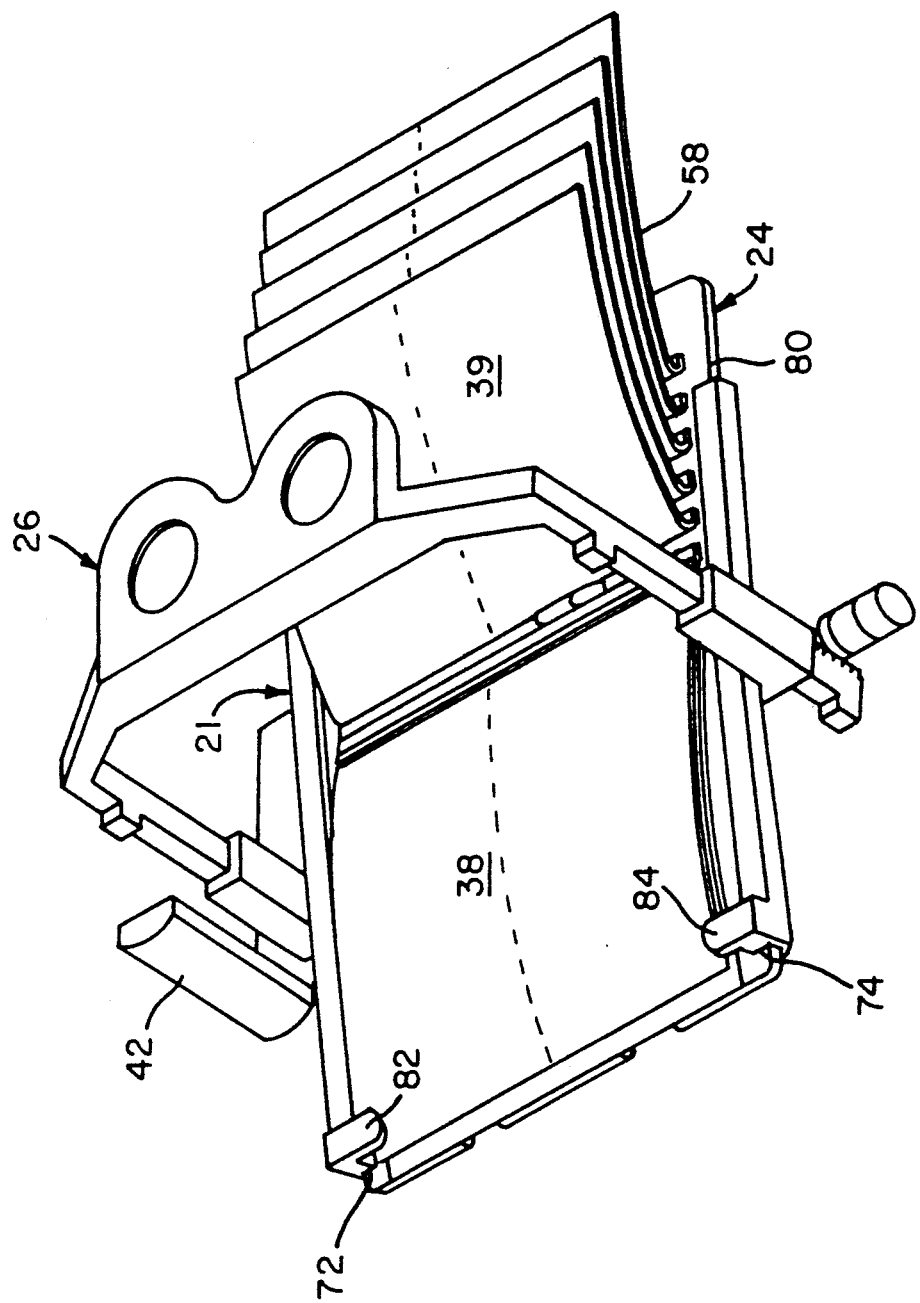
FIG. 7 is a view similar to FIG. 6, showing the deck of photoprints mounted in the viewer being indexed therethrough.

Referring now to FIG. 7, the deck 24 is shown inserted through the retaining gate 70 so as to be slidably secured to the base 22 by slots 74 and 72. The spaced retaining tabs 82 and 84 hold the glassine envelopes 50 containing the photoprints 38 and 39 in place for viewing as the deck of prints is indexed.

Figure 8:
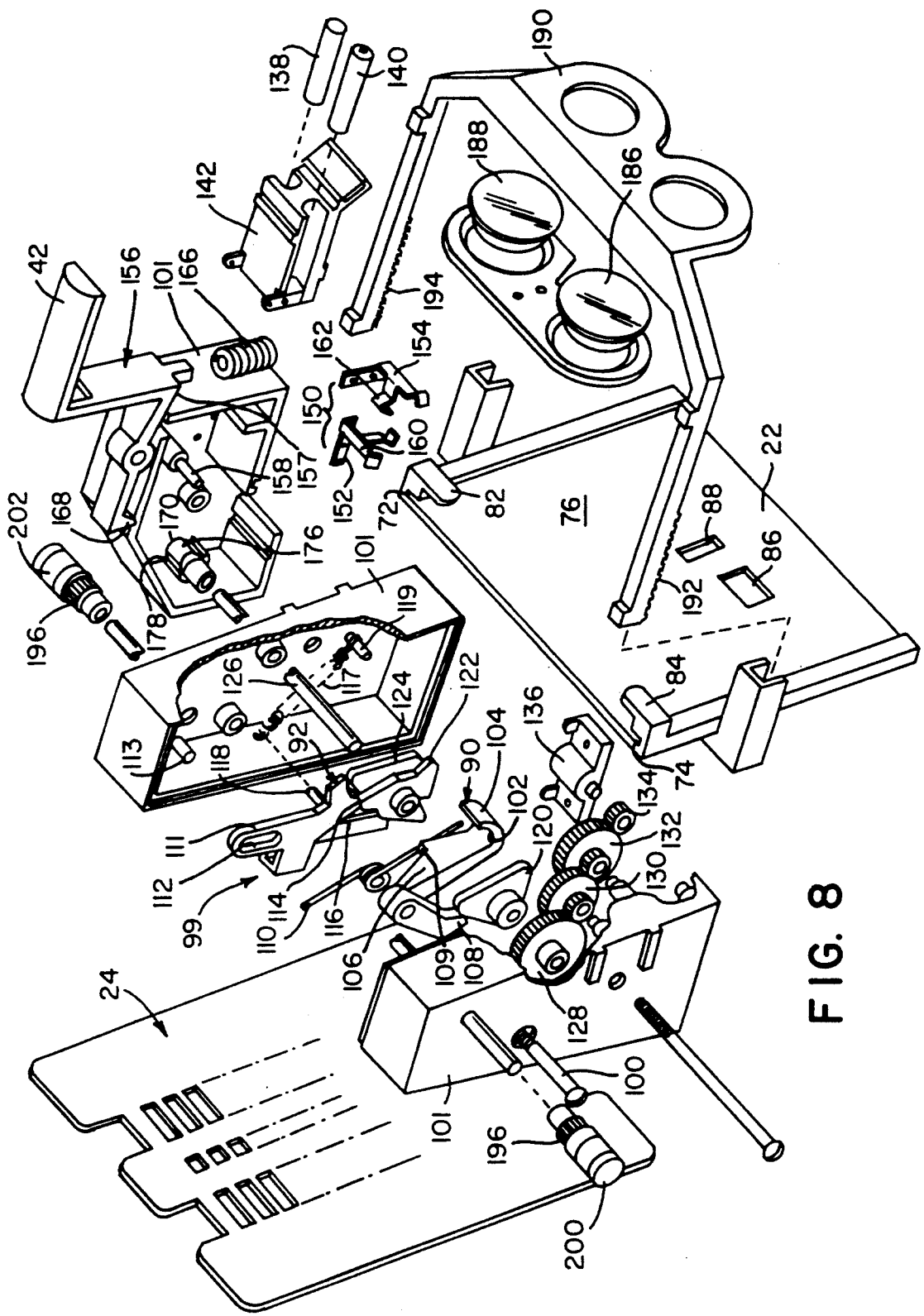
FIG. 8 is an exploded view, in perspective, illustrating the various elements of the portion of the viewer shown in FIGS. 6 and 7.

Referring now to FIG. 8, an exploded view of the stereoscopic viewer 21 discloses the parts of a mechanism, designated generally by the numeral 99, mounted in housing elements 101 and used to drive the kicking foot 90 and picking detent 92 which project through the openings 86 and 88 in the planar surface 76 of base 22. As is seen in perspective in FIG. 8 and in sequential illustrations in FIGS. 9–20, the kicking foot 90 is pivoted on pin 100 and includes a support surface 102 and a pusher surface 104. The surfaces 102 and 104 are opposed to one another and project from a shank 106 which is integral or unitary with a cam follower 108. The shank 106 also has a surface 109 thereon against which a coil spring 110 acts to urge the kicking foot 90 to rotate in a counter-clockwise direction with respect to FIGS. 8–20 so as to project through opening 86.

The picking detent 92, which projects through the opening 88, is integral with a first shank 111 having an elongated mounting slot 112 therein and a first cam follower 114 thereon. A second cam follower 116 on the picking detent 92 is spaced behind and laterally of the first cam follower 114. A tensioned coil spring 117 extends between pin 118 on picking detent 92 and pin 119 on housing 101 to bias the picking detent to rotate in a counter-clockwise direction.

The kicking foot 90 and picking detent 92 are operated independently of, but in concert with, one another by cams. A first cam 120 engages cam follower 108 to operate the kicking foot 90 and two cams 122 and 124 engage cam followers 114 and 116, respectively, to operate the picking detent 92. The cams 120, 122 and 124 are fixed to a drive shaft 126 which, in turn, is geared by a train of gears 128, 130, 132 and 134 to a drive motor 136. As the drive motor 136 rotates gear 134, the first cam 120 moves kicking foot 90 in and out of the opening 86 while cams 122 and 124 move picking detent 92 in and out of the opening 88 so as to advance the deck 24 of photoprints 38 and 39 down the surface 76 of base 22.

The motor 136 is energized by a pair of batteries 138 and 140 mounted in a battery pack 142 which is attached by conventional leads (not shown) to the motor 136. A circuit including the batteries 138 and 140 and motor 136 is closed by a switch 150 which includes contacts 152 and 154. In order to energize the motor 136, a lever, designated generally by the numeral 156, and having button 42 thereon (also see FIGS. 1 and 2) is pivoted on pin 158 and includes a surface 159 which presses leaf-spring 160 of contact 150 into engagement with leaf-spring 162 of contact 154. A coil spring 166 urges the lever 156 away from the contact 160 so that the circuit is normally open and the motor 136 normally de-energized. The lever 156 includes a cam follower detent 168 on the opposite side of pivot 158 from the contact surface 159. The detent 168 rides on the surface of a cam 170 which rotates with the drive shaft 126 that mounts the cams 120, 122 and 124. When the button 42 is pressed to rotate the lever 156 and urge leaf-spring 160 into contact with leaf-spring 162 in the switch 150, the cam 170 rotates with the drive shaft 126, causing one of three high profile surfaces 176 on the cam to engage the cam follower 168 so as to hold the switch 150 closed. Provided the operator's finger is then lifted from the button 42, the cam follower detent 168 will cause the switch 150 to stay closed until, under the bias of coil spring 116, it drops into one of three notches 178 separating the high profile surfaces 176 on the cam 170. When the cam follower 168 drops into one of the notches 178, the contact surface 159 moves away from leaf-spring 160, allowing the switch 150 to open, thus de-energizing the motor 136. When the cam follower detent 168 is in the notch 178, it helps arrest rotation of the shaft 126 and stabilizes the mechanism 99 so that the photoprint 38 or 39 presented for viewing is held stationary.

As is seen in FIG. 8, the stereoscopic viewer 26 includes lenses 186 and 188 which are mounted in a frame 190 having racks of gear teeth 192 and 194 engaged by pinions 196 and 198 fixed to knobs 200 and 202, so that one may advance the lenses toward and away from the photoprint 38 or 39 being viewed. This is a feature which allows one to adjust the distance from the photoprint 38 or 39 being viewed to the lenses 186 and 188 to the distance at which the viewer's eyes best focus on the photoprints.

Referring now primarily to FIGS. 9-20, the operation of kicking foot 90 and picking detent 92 by the cams 120, 122 and 124 is shown sequentially. With respect to FIGS. 9-20, the kicking foot 90 is biased to rotate in a counter-clockwise direction about pivot pin 100 by the spring 110. The picking detent 92 is biased by tensioned spring 117 to rotate in the counter-clockwise direction about pivot pin 113 as the picking detent is being urged downwardly by the tensioned spring so as to normally protrude through the opening 88 in base 22 (see FIG. 6).

Figure 11:
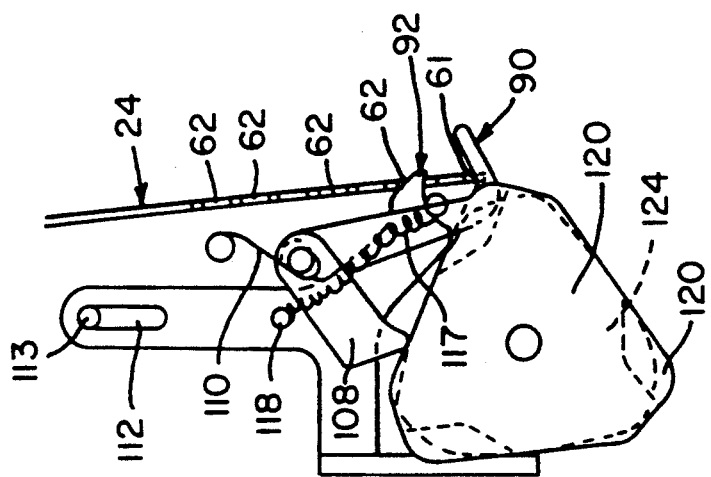
FIGS. 9–17 are side views of an indexing mechanism, according to the instant invention, used to sequentially present photoprints on the deck for viewing.
Figure 10:
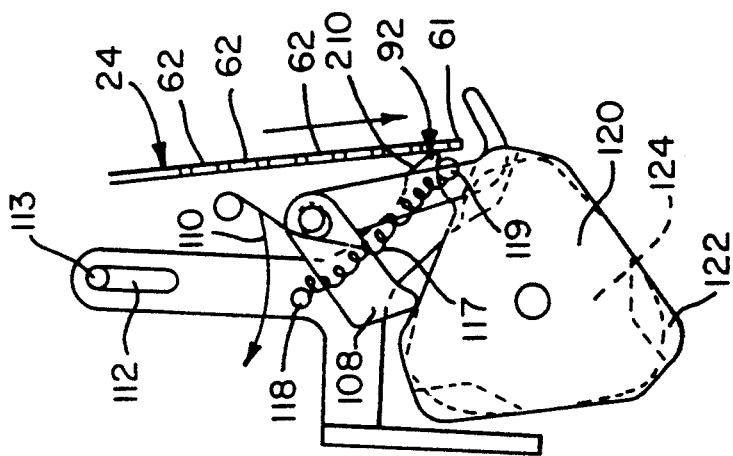
Figure 9:
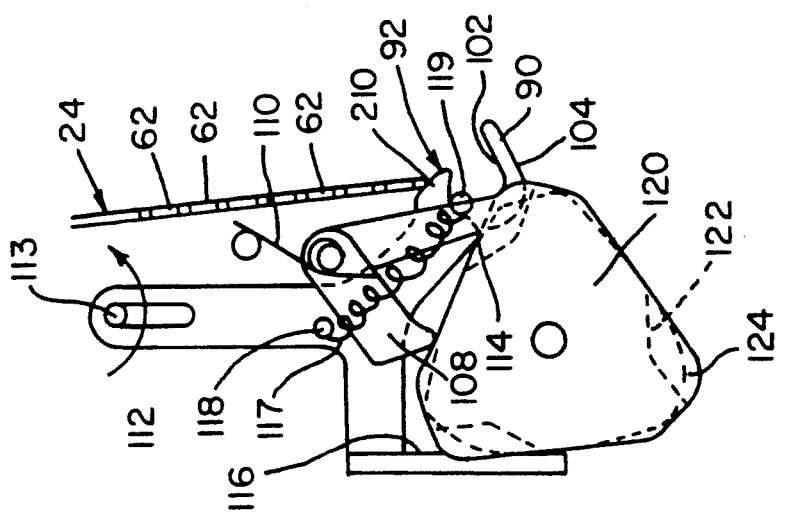

When the deck 24 is inserted through the gate 70 (FIGS. 6 and 7) onto the base 22 of the viewer 21, it is pressed from the FIG. 6 to the FIG. 7 position. As is seen in FIGS. 9, 10 and 11, the gate initially engages a first cam surface 210 on the picking detent 92 and causes the picking detent 92 to rotate about the pivot pin 113 from the FIG. 9 position to the FIG. 10 position. Since the picking detent 92 is biased to rotate counter-clockwise by the tensioned spring 117, the picking detent 92 is held depressed by the deck 26 but snaps back into the first available opening 62 in the deck 24.

Since the kicking foot 90 is continuously urged by coil spring 110 to project through the opening 86 in base 22, the deck 24 will rest its bottom edge slot 61 (also see FIG. 6) on the upper surface 102 of the kicking foot, retaining the deck 24 in place so that the first print 38 or 39 may be viewed through the lenses 186 and 188.

When the deck 24 is being loaded through the retaining gate 70 onto the base 22 (see FIGS. 6 and 7), the motor 136 (see FIG. 8) is not energized so that the cams 120, 122 and 124 are not rotated. In order to index the deck 24 to expose the next print 38 or 39 for viewing, the button 42 (see FIGS. 1, 3 and 8) is depressed, energizing the motor 136 to rotate the shaft 126. Rotation of the shaft 126 rotates the cams 120, 122 and 124 simultaneously.

Figure 12:
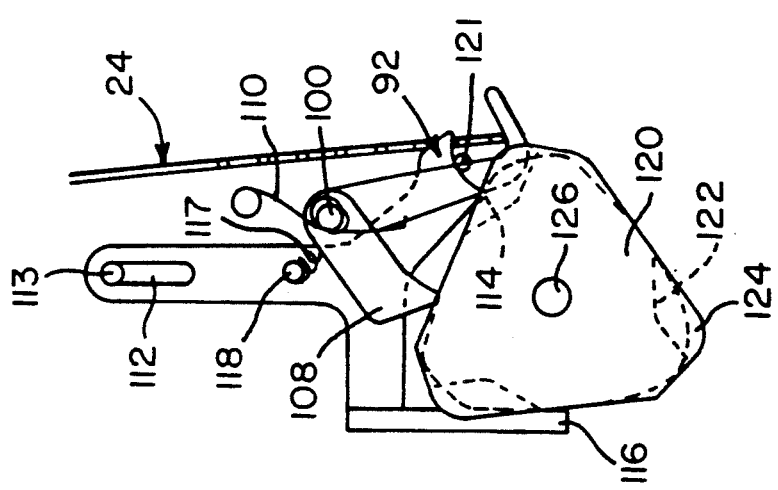

Starting now with FIG. 12 (which is identical to FIG. 11) the cam follower 108 is urged against a relatively flat surface of first cam 120 (solid line) by coil spring 110 while the cam follower 116 is urged against the third cam 124 (dotted line) by tensioned spring 117. The second cam 122, which is the three-point star cam (dot-dash line), is out of engagement with cam follower surface 114 on picking detent 92.

Figure 13:
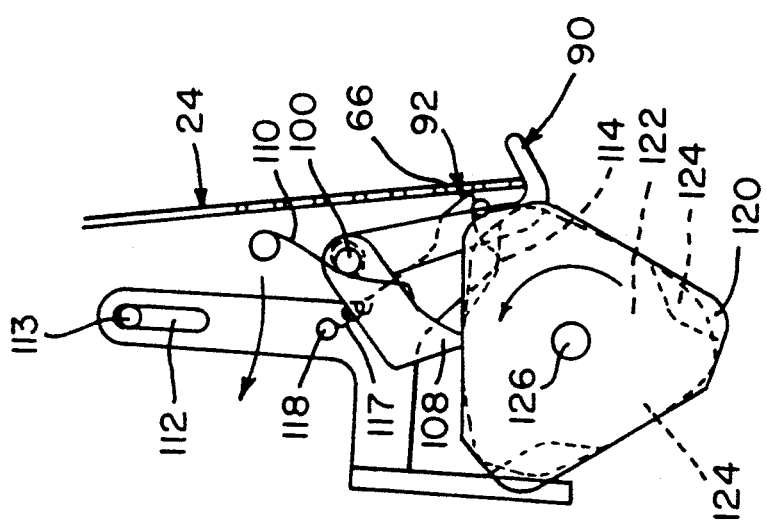

As shaft 126 rotates 24° from the FIG. 12 position to the FIG. 13 position, the kidney lobe of third cam 124 (dotted line) engages cam follower 116 on picking detent 92 to rotate the picking detent about the pin 113 and against the bias of tensioned spring 117 so as to withdraw the picking detent from the opening 62 in deck 24. In the meanwhile, the three-point star cam 122 (dot-dash line) engages the cam follower surface 114 on the picking detent 92 and begins to lift the picking detent. This lift is evident in FIG. 13 where there is a slight space above the pivot pin 113 in the slot 112. During this time, the kicking foot 90 remains projected because it is riding on a relatively flat portion of the first cam 120 (solid lines). Since the kicking foot 90 remains projected, the deck 24 containing the photoprints 38 and 39 remains supported.

Figure 14:
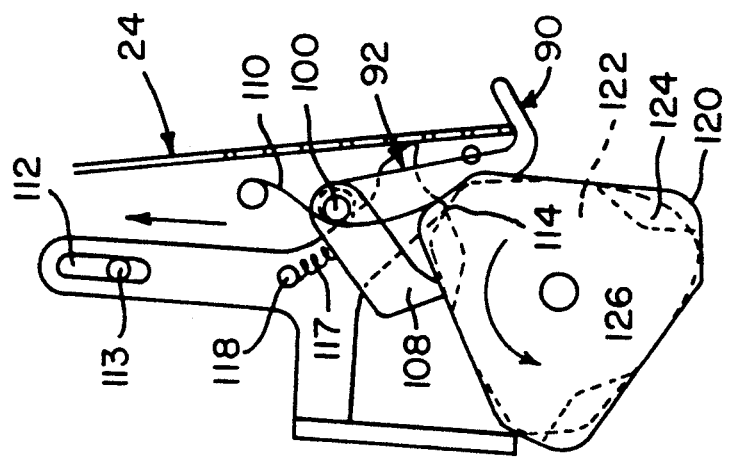

As the shaft 126 continues to rotate through another 24° from the FIG. 13 to the FIG. 14 position for a total rotation of 48°, it is seen that the abrupt surface on the three-point star cam 122 (dot-dash line) engages a sharply rising surface against cam follower surface 114 on picking detent 92 to raise the picking detent from its FIG. 13 to its FIG. 14 position while the picking detent is held retracted by the kidney lobe of cam 124 engaging the follower 116. As the picking detent 92 is lifted while being held retracted, the kicking foot 90 remains projected to support the deck 24.

Figure 15:
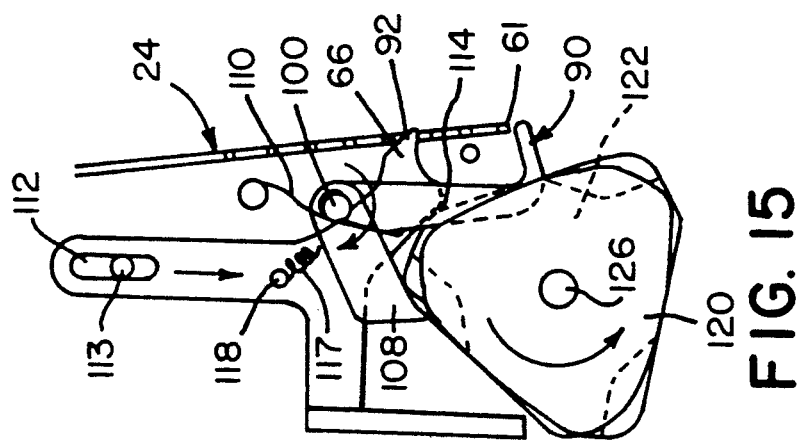

As is seen in FIG. 15, as drive shaft 126 rotates through another 24° (so to have advanced 72° altogether), the picking detent 92 projects through the next recess 62 in the deck 24 and starts in a downward direction under the urging of spring 117. Practically simultaneously with the picking detent 92 travelling downward, the kicking foot 90 withdraws from supporting the deck 24 because the rising surface of cam 120 (solid line) engages cam follower surface 108 to rotate kicking foot 90 out from beneath, and out of engagement with, bottom slot 61 of deck 24.

Figure 16:
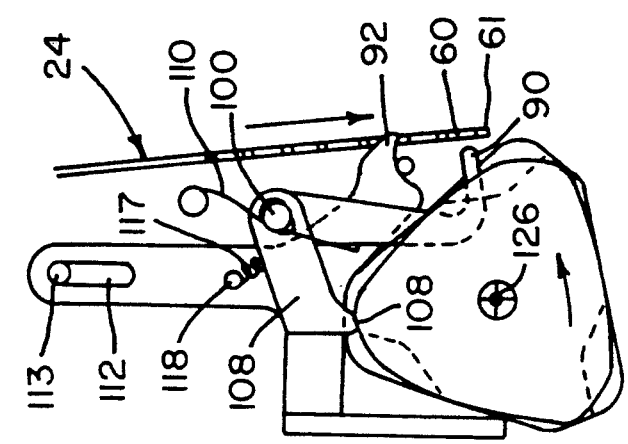

As is seen in FIG. 16, after the shaft 126 has rotated through another 24° (for a total rotation of 96°), the kicking foot 90 is completely withdrawn and the picking detent 92 has moved downward from its FIG. 15 to its FIG. 16 position to positively pull the deck 24 down one position.

Figure 17:
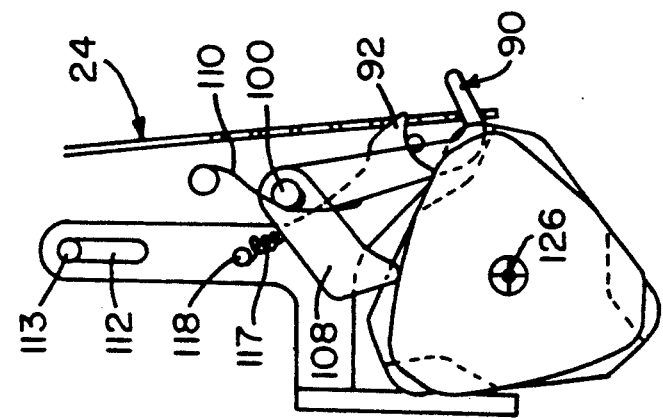

As is seen in FIG. 17, the kicking foot 90 then reprojects into the first recess 60 in the deck 24 under the bias of spring 110 to again support the deck after the deck has indexed one position down. In FIG. 17, the position of the cams 120, 122 and 124 corresponds to the position of the cams of FIGS. 9-11 while the picking detent 92 and kicking foot 90 are in the same positions as FIGS. 9, 11 and 12. The shaft 126 has stopped rotating in FIG. 17 because the cam follower 168 has dropped into one of the dwells 178 on the cam follower 170, opening the switch 150 (see FIG. 8).

The cycle of FIGS. 12–17 repeats itself each time the button 42 (FIGS. 3 and 8) is pressed and released to ratchet or index the deck 24 downwardly so as to expose successive photoprints 38 or 39. If the button 42 is held depressed, then the cam 170 on shaft 126 is inoperative and the cycle will continue without pause until the button 42 is released so that the cam follower 168 will drop into one of the three dwells 178 on the cam 170 to stop rotation of drive shaft 126.

Figure 20:
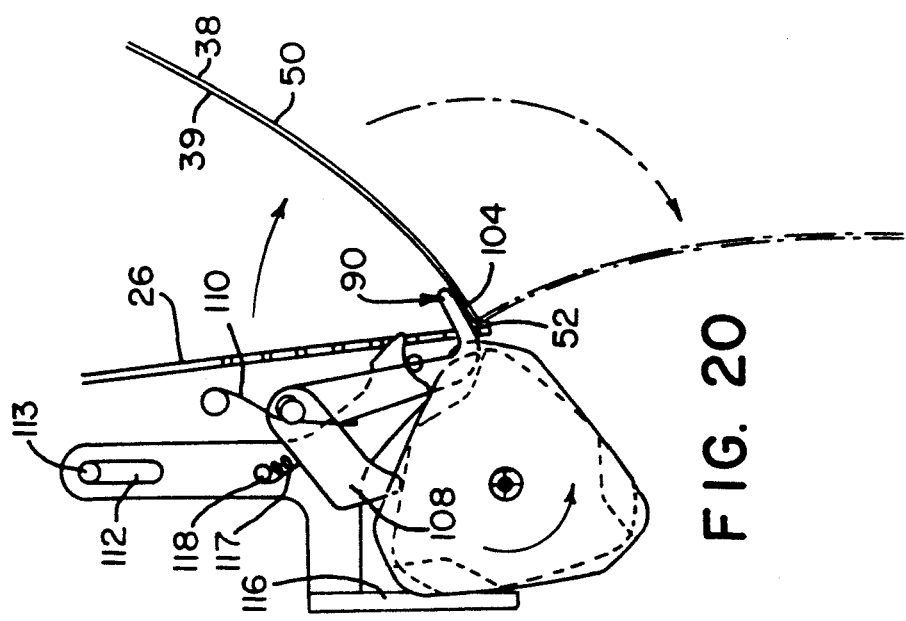
FIGS. 18–20 are side views similar to FIGS. 9–17 showing how a single photoprint on the deck of photoprints is pivoted over by the indexing mechanism as the deck indexes through the stereoscopic viewer.
Figure 19:
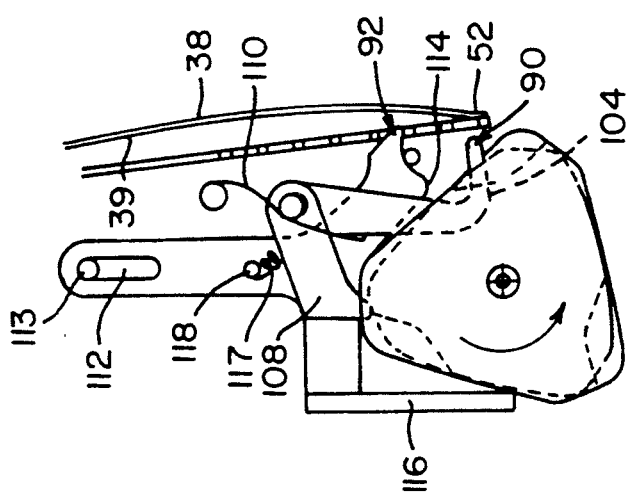
Figure 18:
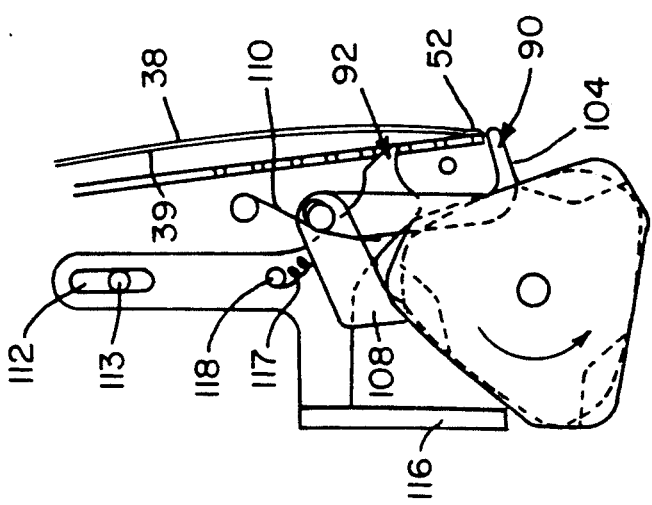

Referring now to FIGS. 18–20, where operation of the kicking foot 90 is illustrated and the steps of FIGS. 15, 16 and 17 are repeated, it is seen that the glassine envelopes 50 containing the photoprints 38 are positively pushed over as the bottom surface 104 of kicker foot 90 engages behind each glassine envelope at the hinge 52 thereof. Since the deck 24 has an orientation which has a substantial vertical component, the envelopes 50 readily flip over when kicked by the kicking foot 90.

The distance between retaining tabs 82 and 84 (FIGS. 7 and 8) and the top surface 102 of kicking foot 90 is such that the distance moved by deck 24 upon each index is sufficient to allow the top edge of the next glassine envelope 50 in the series to clear retaining tabs 82 and 84 so that the envelopes will readily pivot downwardly when pushed by the surface 104 of kicking foot 90.

As was explained with reference to FIGS. 6 and 7, after the photoprints 38 are viewed, the deck 24 may be inserted from the opposite edge and photoprints 39 viewed.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An automatic stereoscopic viewer for viewing stereoscopic photoprints, the viewer comprising:
   a stereoscopic lens arrangement mounted on a base over which base a plurality of stereoscopic prints are linearly advanced;
   means for pivotally mounting the stereoscopic photoprints on a carrier deck wherein the carrier includes first and second openings;
   a foot means for supporting the carrier deck on the base, the foot means including a surface thereon for engaging the photoprint for kicking the photoprint over after the photoprint has been viewed;
   means for causing the foot means to sequentially engage the first recesses in the carrier deck individually;
   picking means on the base for positively engaging the second recesses on the carrier deck individually; and
   control means for retracting and projecting the foot means in concert with advancing the picking means to index the carrier over the base so as to sequentially view the photoprints, the control means includes a drive shaft with cam means thereon for engaging the foot means and picking means and a motor connected to the drive shaft for cycling the cam means by rotating the drive shaft.

2. The automatic stereoscopic viewer of claim 1, wherein the control means further includes operating means for advancing the photoprints singularly between viewings and, optionally, plurally between viewings.

3. An automatic stereoscopic viewing system comprising:
   a plurality of carrier decks each having a plurality of stereoscopic photoprints pivotally mounted thereon in overlapping relationship, the carrier decks each including first openings and second openings arranged in rows;
   a stereoscopic lens arrangement mounted on a base adapted to receive the carrier decks individually;
   foot means on the base for supporting one of the carrier decks on the base by engaging the first openings;
   picking means on the base for engaging the second openings;
   control means for retracting and projecting the foot means in concert with advancing the picking means to index the carrier deck over the base so as to sequentially present the photoprints for viewing; and
   means for electrically driving the control means.

4. The automatic stereoscopic viewing system of claim 3, wherein the stereoscopic photoprints are mounted in transparent envelopes which are hinged to the carrier decks with at least some of the envelopes including two stereoscopic photoprints placed back-to-back so that a first set of photoprints faces in one direction and a second set of photoprints faces in the opposite direction, the openings in the carrier decks being positioned so that each carrier deck is advanced in one direction to view the first set of photoprints and advanced in the opposite direction to view the second set of photoprints.

5. The stereoscopic viewing system of claim 4, wherein the carrier decks include means for retaining the carrier decks together in binders.

6. In an automatic viewer for viewing pictures wherein the pictures indexed for viewing individually, the improvement comprising:
   a carrier deck for the pictures wherein the carrier deck includes a row of first openings and a row of second openings;
   a base for supporting the carrier deck wherein the base has a first opening alignable individually with the first openings in the carrier deck and a second opening alignable individually with the second openings in the carrier deck;
   a kicking foot mounted on the base and alignable with the first opening in the base for receipt in the first openings in the carrier deck to support the carrier deck when projected through the first opening in the base and to kick over a picture previously viewed;

a picking detent mounted on the base and alignable with the second opening in the base for receipt in the second openings in the carrier deck; and control means connected to the kicking foot and picking detent for (a) projecting the kicking foot through the first opening to hold the carrier deck stationary on the base for viewing; (b) indexing the picking detent from one second opening in the carrier deck to the next second opening in the carrier deck; and (c) advancing the picking detent to move the carrier deck to position the next picture for viewing.

7. The improvement of claim 6, wherein the control means includes a drive shaft having cam means thereon for engaging and moving the kicking foot and picking detent and electric motor means for rotating the drive shaft.

8. The improvement of claim 7, wherein the cam means comprises a first cam for engaging the kicking foot, a second cam for engaging the picking detent to retract the picking detent and a third cam to lift the picking detent, and wherein the control means further includes spring means for urging the kicking foot to project through the first opening in the base and for urging the picking detent to project through the second opening in the base.

* * * * *